US00RE33896E

United States Patent [19]

Maghon et al.

[11] E Patent Number: Re. 33,896

[45] Reissued Date of Patent: Apr. 21, 1992

[54] COMBUSTION CHAMBER APPARATUS FOR COMBUSTION INSTALLATIONS, ESPECIALLY FOR COMBUSTION CHAMBERS OF GAS TURBINE INSTALLATIONS, AND A METHOD OF OPERATING THE SAME

[75] Inventors: Helmut Maghon; Bernard Becker, both of Mülheim am Ruhr, Fed. Rep. of Germany

[73] Assignee: Siemens Aktiengesellschaft, Munich, Fed. Rep. of Germany

[21] Appl. No.: 415,997

[22] Filed: Oct. 2, 1989

Related U.S. Patent Documents

Reissue of:

[64] Patent No.: 4,701,124
Issued: Oct. 20, 1987
Appl. No.: 836,232
Filed: Mar. 4, 1988

[30] Foreign Application Priority Data

Mar. 4, 1985 [DE] Fed. Rep. of Germany ..... 3507516

[51] Int. Cl.[5] ..... F23Q 9/00

[52] U.S. Cl. ..... 431/284; 60/39.55; 60/746; 60/747; 60/748; 60/39.826; 431/183; 431/185

[58] Field of Search ..... 431/4.9, 174, 175, 177, 431/284, 285; 60/39.55, 39.826, 733, 746, 747, 748

[56] References Cited

U.S. PATENT DOCUMENTS

| | | | |
|---|---|---|---|
| 2,822,864 | 2/1958 | Black | 431/175 |
| 2,834,407 | 5/1958 | Mason | 431/175 |
| 2,847,063 | 8/1958 | Reed et al. | 431/175 |
| 2,973,032 | 2/1961 | Reilly et al. | 431/182 |
| 3,032,097 | 5/1962 | Marshall | 431/9 |
| 3,174,527 | 3/1965 | Reed et al. | 431/175 |
| 3,256,842 | 6/1966 | Vigneron et al. | 431/46 |
| 3,483,700 | 12/1969 | Ryberg et al. | 431/187 |
| 3,985,494 | 10/1976 | Childree | 431/175 |
| 4,342,198 | 8/1982 | Willis | 60/748 |
| 4,575,332 | 3/1986 | Oppenberg et al. | 431/4 |

FOREIGN PATENT DOCUMENTS 2123945 2/1984 United Kingdom .

OTHER PUBLICATIONS

U.S. Publication ASME 82-GT-29, article "Alternative Fuels: Burner Concepts and Emission Characteristics of a Silo Combustor", by W. Krockow et al, pp. 1-10; FIG. 1 (date unknown).

*Primary Examiner*—Carroll B. Dority
*Attorney, Agent, or Firm*—Herbert L. Lerner; Laurence A. Greenberg

[57] ABSTRACT

In a combustion chamber having a *substantially cylindrical housing and a* flame tube [therein at an annular gap from a housing of the chamber,] *with an end face, the flame tube being thermally movable and disposed in the combustion chamber and the flame tube being spaced from the cylindrical housing defining an annular gap therebetween, the improvement includes* a burner apparatus *having a burner axis and* including at least one pilot burner [near an] *having a head and being disposed in the vicinity of the* end face of the flame tube for generating a pilot flame [from] , *the pilot burner operating with at least one fuel from the group consisting of* natural gas [and/or] *and* heating oil, an air supply channel surrounding the head [of the pilot burner], a premixing device for [natural gas] *mixing gas and air* in the form of a ring channel system surrounding the head, *the ring channel system* including flow conduction walls defining an inflow cross section at an air inflow side of the ring channel system *being* open toward the annular gap for conducting a majority of *available* combustion air *in a given flow direction* from the annular gap to a combustion zone developing downstream of the burner head in the flame tube, the combustion air having flow vectors with components entering the combustion zone in directions *ranging* from parallel to the burner axis to an acute angle *relative* to the burner axis, the combustion air components having swirl components superimposed thereon [tangentially relative] *circumferentially* to the burner axis [acting] , *using the burner axis* as a swirl center, [a multiplicity of nozzle tubes penetrating the inflow cross section in a direction substantially transverse to the flow direction, the nozzle tubes each having a side with nozzle openings facing away from the air inflow side of the ring channel system,] *a device defining nozzle openings disposed in the ring channel system,* and a [natural] gas feeding system [substantially concentrically surrounding the pilot burner and] connected to [one end of each nozzle tube, and a method of operating the same] *the nozzle openings for feeding gas thereto.*

18 Claims, 2 Drawing Sheets

COMBUSTION CHAMBER APPARATUS FOR COMBUSTION INSTALLATIONS, ESPECIALLY FOR COMBUSTION CHAMBERS OF GAS TURBINE INSTALLATIONS, AND A METHOD OF OPERATING THE SAME

Matter enclosed in heavy brackets [ ] appears in the original patent but forms no part of this reissue specification; matter printed in italics indicates the additions made by reissue.

*This is a reissue of application Ser. No. 836,232 filed Mar. 4, 1986, which became U.S. Pat. No. 4,701,124, and is now surrendered.*

The invention relates to a burner apparatus for combustion installations, especially for combustion chambers of gas turbine installations, the combustion chamber including a substantially cylindrical housing and a flame tube thermally movable and centered therein with an annular gap, and the burner apparatus including at least one pilot burner disposed in the vicinity of the end face of the flame tube for generating a pilot flame, the pilot burner being operated with natural gas and/or heating oil as a fuel, an air supply system and a ring channel system surrounding the head of the pilot burner with flow conduction walls for the supplying the main portion of the combustion air from the annular gap to a combustion zone developing downstream of the burner head in the flame tube, the combustion air having flow vectors with components leading into the combustion zone in directions from parallel to an acute angle relative to the burner axis, and the the combustion air components having swirl components superimposed thereon being tangentially directed relative to the burner axis acting as a swirl center.

Such a burner apparatus must meet a number of requirements so that the operation thereof is assured even when considering more stringent environmental protection regulations: Thus, the $NO_x$ content in the exhaust gas must not exceed upper limits. This means that the temperatures in the combustion zone must not be too high and sufficient amounts of combustion air must be fed to the combustion zone, an excess of air being generally maintained. It should be possible to operate the burners not only with heating oil, but also with natural gas.

Another special problem is the retrofitting of burner apparatus which, while they meet present $NO_x$ limits, will not meet future $NO_x$ limits.

It is accordingly an object of the invention to provide a combustion chamber apparatus for combustion installations, especially for combustion chambers of gas turbine installations, which overcomes the hereinaforementioned disadvantages of the heretofore known apparatus of this general type, and to do so in such a way that it ensures operation with low $NO_x$ contents in the exhaust gas in accordance with the requirements indicated above, and which permits retrofitting of existing burner apparatus in order to reduce the $NO_x$ exhaust gas values, without having to replace the entire burner apparatus. A further object of the invention is to provide a suitable method for operating the burner apparatus which causes a production of $NO_x$ that is as small as possible.

With the foregoing and other objects in view there is provided, in accordance with the invention, in a combustion chamber, especially of a gas turbine installation, having a substantially cylindrical housing and a flame tube with an end face, the flame tube being thermally movable and centered in the combustion chamber and the flame tube being spaced from the cylindrical housing defining an annular gap therebetween, the improvement comprising a burner apparatus having a burner axis and including at least one pilot burner having a head and being disposed in the vicinity of the end face of the flame tube for generating a pilot flame, the pilot burner operating with at least one fuel from the group consisting of natural gas and/or heating oil, an air supply channel surrounding the head, a premixing device for the combustion of natural gas in the form of a ring channel system surrounding the head, the ring channel system including flow guide or conduction walls defining an inflow cross section at an air inflow side of the ring channel system being open toward the annular gap for conducting a majority or main portion of available combustion air in a given flow direction from the annular gap to a combustion zone developing downstream of the burner head in the flame tube, the combustion air having flow vectors with components entering the combustion zone in directions ranging from parallel to the burner axis to an acute angle relative to the burner axis, the combustion air components having swirl components superimposed thereon tangentially relative to the burner axis, using the burner axis as a swirl center, a multiplicity of nozzle tubes penetrating the inflow cross section in a direction substantially transverse to the given flow direction, the nozzle tubes each having ends and having a side with nozzle openings facing away from the air inflow side of the ring channel system, and a natural gas feeding system substantially concentrically surrounding the pilot burner and being connected to one of the ends of each of the nozzle tubes.

In accordance with another feature of the invention, the pilot burner has an axis, and the natural gas feeding system has an annular inlet chamber with a connecting wall for the nozzle tubes being conically bevelled relative to the axis of the pilot burner.

In accordance with an added feature of the invention, the flow conduction walls are in the form of inner and outer walls bounding the ring channel system, each of the inner and outer walls being disposed at least approximately on a respective conical surface having conical axes coinciding with with the axis of the pilot burner, the walls being mutually axially offset along the pilot burner axis, and the conically bevelled connecting wall of the annular inlet chamber being extended along the same direction as the inner conical wall.

In accordance with a further feature of the invention, the conically bevelled connecting wall of the annular inlet chamber at least partially coincides with the inner conical wall.

In accordance with an additional feature of the invention there is provided a cylinder wall surrounding the pilot burner coaxially and defining a ring niche along with the inner flow conduction wall, the annular inlet chamber being disposed in the ring niche.

In accordance with yet another feature of the invention, the nozzle tubes have axes, and including a swirl vane system disposed downstream of the nozzle tubes having longitudinal guide vane axes extending substantially parallel to the axes of the nozzle tubes.

In accordance with yet a further feature of the invention, the pilot burner includes a swirl star on the side of the burner head defining a flow space, a central burner tube for supplying heating oil, a first burner jacket surrounding the burner tube at a distance defining a first annular space for feeding natural gas, a nozzle wall connecting the first annular space with the flow space of the swirl star in the vicinity of the burner head, a second burner jacket in the form of an outer cylinder wall surrounding the first burner jacket at a distance defining a second annular space coaxial with the burner acting as an air supply channel of the pilot burner, the second annular space also being connected to the flow space of the swirl star, and means for feeding an inert substance into the combustion zone.

In accordance with yet a further feature of the invention, there is provided a natural gas feedline connected to the annular inlet chamber, the annular inlet chamber being steadily tapered in the shape of a snail shell from a larger starting cross section following the natural gas feedline down to a smaller end cross section, the nozzle tubes being the form of a nozzle tube ring including last nozzle tubes to be acted upon, the last nozzle tubes being connected to the end cross section of the annular inlet chamber.

In accordance with yet another feature of the invention, there is provided a plurality of gas inlets distributed over the periphery of the pilot burner for supplying gas to the pilot burner, the gas inlets being fed and controlled separately and being disposed in the air supply channel at a distance upstream from the swirl star.

In accordance with still an added feature of the invention, the gas inlets are formed of a plurality of additional tubes passing through the first burner jacket and being distributed over the periphery of the air supply channel.

In accordance with still an additional feature of the invention, the additional tubes include tube sections extending over a given distance into the air supply channel.

In accordance with still another feature of the invention, the tube sections include a plurality of gas outlet openings within the air supply channel.

In accordance with again an added feature of the invention, the gas outlet openings are substantially perpendicular to the given flow direction.

In accordance with again another feature of the invention, there is provided a ring channel being concentric to the air supply channel and having a separate gas feedline, the gas inlets being in the form of holes formed in the one of the burner jackets communicating with the ring canal.

In accordance with again a further mode of the invention, there is provided a method of operating a burner apparatus of a combustion chamber having a substantially cylindrical housing and a flame tube having an end face and being disposed in the housing at a distance from the housing defining a ring gap therebetween, which comprises feeding a given amount of at least one fuel from the group consisting of natural gas and heating oil to a pilot burner having a head and being disposed in the vicinity of the end face of the flame tube, feeding combustion air from the ring gap through an air supply channel surrounding the head and through a ring channel system developing a combustion zone downstream of the burner head in the flame tube, as seen in flow direction of the combustion air, and feeding a quantity of inert substances to the combustion zone equal to substantially between 50% and 120% of the given amount of fuel fed to the pilot burner, forming as large a portion of inert substances in a flame of the pilot burner as possible during operation near a given design point.

In accordance with again an additional mode of the invention, there is provided a method which comprises adjusting the quantity of inert substances to 100% of the given amount of fuel fed to the pilot burner.

In accordance with again a further mode of the invention, there is provided a method, which comprises feeding a substance from the group consisting of water and steam as the inert substance.

In accordance with still an added mode of the invention, there is provided a method, which comprises changing the ratio of fuel to air at the pilot burner as a function of the total quantity of fuel.

In accordance with still another mode of the invention, there is provided a method, which comprises increasingly feeding gas quantities into the air supply channel with decreasing total fuel quantity, in order to stabilize the flame of the burner apparatus by intentional inhomogeneity, and operating the pilot burner at an approximate air number of $\lambda=1.4\pm0.4$.

In accordance with a concomitant mode of the invention, there is provided a method, which comprises adjusting the quantity of gas being fed in the vicinity of the design point forming an approximately uniform mixture at the outlet of the pilot burner with about the same air number as in an outer main flow.

Among others, the advantages obtainable with the invention are that the ring channel system which is already present is constructed in such a way that the flow conduction walls serve as the support of a premixing burner device which permits retrofitting of existing burner apparatus. The methods for operating a retrofitted burner apparatus described above permit a mode of operation in which the $NO_x$ emission is minimized without an excessive increase of the consumption of additives, particularly water. The invention begins from the insight that without suitable counter measures, by far the largest part of the $NO_x$ production takes place in the pilot flame of the pilot burner, although the fuel share of this flame is only about 5 to 10% of that of the entire burner apparatus. A decisive reduction of the $NO_x$ emission can therefore be achieved by suitably influencing the pilot flame. The quantities of the substance consumed, which may be water or water vapor, are in the order of magnitude of about 100% of the amount of fuel of the pilot burner, which are still relatively small.

The relocation of the gas inlets into the channel originally serving for the air supply permits quasi-operation of the pilot burner as a premixer burner. A load-dependent change of the ratio of fuel to air, permits the stability of the pilot flame and therefore of the entire burner flame to be maintained. In regions in which the burner flame already burns in a stable manner ($\lambda=1.8\pm0.4$), the pilot flame can be operated with such a ratio of fuel and air. If the total load is reduced, i.e. with a decreasing total amount of fuel, the fuel portion in the pilot flame must be increased (for instance to $\lambda=1.4\pm0.4$). This intended inhomogeneity stabilizes the entire flame configuration of the burner. The advantage of this procedure is that it produces a lowering of the $NO_x$ emission in the vicinity of the design point by reducing the $NO_x$ generation in the pilot flame and that it produces an extension of the operating range of the burner apparatus in the direction toward smaller air numbers. In the partial-load range, the $NO_x$ emission can be kept low by additional admisture of water or steam in spite of the inhomogeneity of the mixture field. In this connection it is important for the admixed inert substances to be present in the pilot flame as completely as possible. In the vicinity of the design region, i.e. in the preferred operating range of the apparatus, the admixture of inert substances can generally be dispensed with.

Other feathers which are considered as characteristic for the invention are set forth in the appended claims.

Although the invention is illustrated and described herein as embodied in a combustion chamber apparatus for combustion installations, especially for combustion chambers of gas turbine installations, and a method of operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
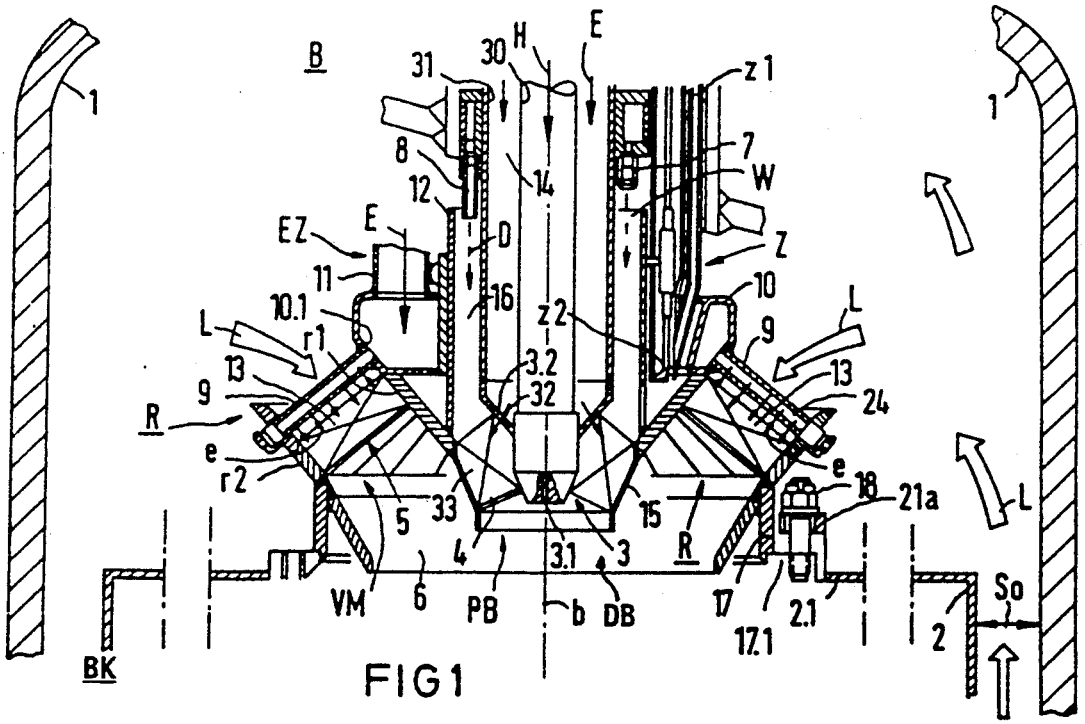
FIG. 1 is a fragmentary, diagrammatic, axial-sectional view of a burner apparatus according to the invention, omitting parts of the burner not necessary for an understanding of the invention, as well as a combustion chamber.

Referring now to the figures of the drawings in detail and first, particularly, to FIG. 1 thereof, there is seen a burner apparatus B which is part of a gas turbine installation that is the preferred application of the invention. However, the burner apparatus B is also suitable for gas-fired combustion systems of boilers.

A corresponding combustion chamber BK includes an approximately cylindrical housing 1 shown in a detailed axial section and a flame tube 2, which is held therein with an annular gap So, in a thermally movable and centered manner. The housing 1 is diagrammatically illustrated, it is not drawn to scale and the embodiment is not limited to the burner apparatus B with a single burner; as a rule, the combustion chamber BK includes six burners which are disposed in a hexagonal configuration or eight in an octagonal configuration.

Each individual burner apparatus B is formed of at least one pilot burner PB which is disposed with fuel nozzles 3.1, 3.2 and with swirl vanes swirl stars 4 of a burner head 3 thereof in the vicinity of an an end face of the flame tube 2 and which can be operated with natural gas E and/or heating oil H as the fuel. The head 3 of the pilot burner PB is surrounded coaxially (relative to a burner axis b) by a system of ring canals R with inner and outer flow conduction walls r1 and r2. In this way, an annular canal cross section 5 is formed which serves for supplying the main portion of the combustion air L from the annular gap So to a non-illustrated combustion zone which develops downstream of the burner head 3. The pressurized combustion air L is fed to the annular gap by the compressor of the gas turbine; the hot fuel gases flow into the turbine blade system.

The combustion air L with admixed natural gas, if applicable, passes from the annular canal cross section 5 into a circular cross section 6 disposed downstream of the burner head 3, and leads into a swirl zone with a recirculation region in the flame area, together with air entering through an annular space 16 coaxial to the burner. It is important that the local velocity in the rotary flow which is formed is high enough to intermittently mix the combustion air with the flame cone of the injected, finely atomized heating oil H or the blown-in natural gas E, so that the dwelling time of the reaction mixture is minimized in the area of stoichiometric conditions in cooperation with the fuel supply of the pilot flame, whereby the lowest possible $NO_x$ content is assured. The $NO_x$ content can be reduced further by the injection of water from water nozzles 7 or steam D from steam nozzles 8 as indicated by broken lines. It is especially advantageous if these inert substances are also present in the pilot flame in particular, since otherwise most of the $NO_x$ is generated there. The disposition of the nozzles 7, 8 in accordance with the invention makes this possible.

According to the invention, the ring canal system R with its flow conduction walls r1, r2 is furthermore constructed as a premixer device VM for the combustion of natural gas E. To this end, the inflow cross section 5 (which is also referred to as the canal cross section) of the ring canal system R which is open toward the ring gap. So, is penetrated by a multiplicity of nozzle tubes 9 aligned approximately transversely to the flow of the air L. The ends of the nozzle tubes 9 facing the inner flow conduction wall r1 are connected to a natural gas feeding system EZ, which surrounds the pilot burner PB approximately concentrically. As is illustrated by the small natural gas flow arrows e, the nozzle openings of the nozzle tubes 9 are disposed on the side of the nozzle tubes 9 facing away from the air inflow side of the ring canal system R. Each of the nozzle tubes 9 which are distributed over the annular canal cross section 5 and could be constructed as so-called "little tubes" in comparison to the tube dimensions of a diffusion burner DB, has five nozzle openings and the ring of nozzle tubes 9 in the embodiment includes 24 "little tubes" which, however, still leave still enough inflow cross section free for the combustion air L. The ring of little tubes acts like a natural gas shower which contributes to optimum mixing with the combustion air L.

The natural gas feeding system for the premixing burner VM has an annular inlet chamber 10 with a connecting wall 10.1 for the nozzle tubes 9, which is conically bevelled relative to the axis b of the pilot burner PB. The inflow chamber 10 steadily tapers from a larger starting cross section (at the left-hand side of FIG. 1) connected to a natural gas feedline 11, down to a smaller final cross section (at the right-hand side of FIG. 1) in the form of a snail-shaped housing. The last of the nozzles tubes 9 of the nozzle tube ring to be acted upon are connected in such a way that the flow velocity of the combustion air is approximately the same at all of the nozzle openings.

The ring channel or canal or canal system R is bounded by the above-mentioned inner and outer flow conduction walls r1, r2, each of which are located at least approximately on a conical surface, the conical axes of which coincide with the axis b of the pilot burner PB. The walls are mutually axially offset for forming the annular canal cross section 5 in the direction of the pilot burner axis. The conically bevelled connecting wall 10.1 of the inflow chamber 10 follows the same direction as the conical flow conduction wall r1 and partially coincides therewith, as can be seen. A particularly space-saving measure which is advantageous for the flow is achieved, if the inflow chamber 10 is disposed in a ring niche which is defined by a cylinder wall 12 surrounding the pilot burner PB and the inner flow conduction wall r1, as shown.

A rotary component is impressed on the combustion air L flowing into the premixing burner VM by a swirl vane 13 which is downstream of the nozzle tubes 9. The longitudinal axis of the guide vanes of the swirl vane 13 extend approximately parallel to the nozzle tube axes.

The function of the pilot burner PB is supplemented by the premixing burner VM, i.e. in natural gas operation, it is possible to switch the premixer burner operation with its lower $NO_x$ values, after the pilot burner is started and warmed up. The pilot burner PB is ignited by an ignition burner Z thereof which has a gas tube z1 and a rod or tube-shaped electrode configuration z2 for this purpose. The ignition burner Z is extinguished if a permanent flame burns at the burner head downstream thereof; the premixing burner VM is ignited by the flame of the pilot burner PB. The flame cannot flash back into the premixing burner region even without a flame holder, if attention is paid to providing sufficient air velocity. A central tube 30 of the pilot burner PB serves for supplying heating oil H and a first burner jacket 31 surrounding the central burner tube forms an annular space or channel 14 for feeding the natural gas E. In the vicinity of the burner head 3, the annular space 14 discharges through a conical nozzle wall 32 into a flow space 33 of the swirl vane or swirl star 4 on the side of the burner head, which is held by its guide blades between the inner nozzle wall 32 and an outer conical skirt 15. The outer conical skirt 15 is fastened at the edge of a truncated conical opening of the inner flow guide wall r1. A second burner jacket concentrically surrounding the first burner jacket 31 is formed by the outer cylinder wall 12 which defines a second annular space or channel 16 coaxial with the burner. The ring space 16 likewise ends in the flow space of the swirl vane or star 4 on the side of the burner head and serves for supplying air to the pilot flame and optionally for feeding-in water W through the nozzles 7 or steam D through the nozzles 8 as already explained above. The entire burner unit PB/VM is fastened at its lower end to a flange 2.1a of the end face 7.1 of the flame tube 2 by means of a tube stub 17 with a flange 17.1. The tube stub 17 is welded to the outer flow conduction wall r2. Flange screws are designated with reference numeral 18.

Figure 2:
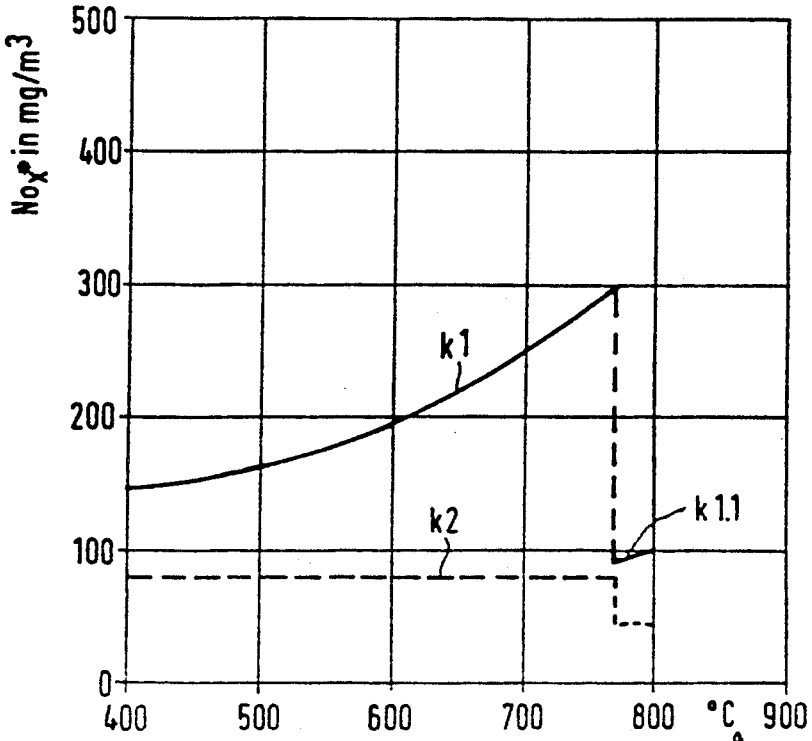
FIG. 2 is a diagram in which, for instance, the $NO_x$ content in $mg/m^3$ is plotted on the ordinate axis as a function of the gas turbine entrance temperature $\theta_{TI}$ of the combustion gas on the abscissa axis.

In the diagram of FIG. 2, an upper curve k1 shows the $NO_x$ emission in the exhaust gas for 15% by volume $O_2$ during operation of the hybrid burner without $H_2O$ injection and without an activated premixing burner VM, as a function of the temperature $\theta_{TI}$, which is the gas turbine inflow temperature of the working medium. A curve k1.1 shows the steep drop of the $NO_x$ emission for a transition to the premixing burner operation; and the curve k2 shows the further reduction of the $NO_x$ content in the exhaust gas during operation of the hybrid burner with $H_2O$ injection.

Figure 3:
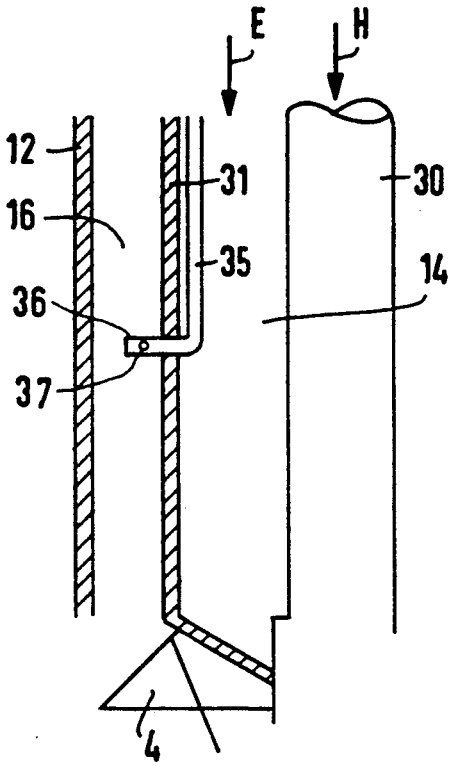
FIG. 3 is an enlarged view of a portion of FIG. 1 illustrating the placement of gas inlets in the air supply canal of the pilot burner.

FIG. 3 diagrammatically illustrates one possible embodiment for changing the gas inlets or tube sections 36 to the pilot burner PB in the second annular space 16 which is coaxial with the burner and otherwise serves for the air supply. This is done for the load-dependent change of the fuel/air mixture. The gas can be fed into the annular space 16 through an additional pipeline or tube 35 which is fed and controlled separately and which is brought through the inner wall 31 of the second annular space 16. Suitable outlet openings 37 which are preferably located perpendicular to the remaining air flow in the ring space 16, allow good mixing to take place. In this manner, the pilot burner PB is no longer operated as a diffusion burner but rather as a separately controlled quasi-premixing burner. Basically, the path through which the additional air is fed is of secondary importance, so that there are many possibilities for installing the pipeline 35 and the gas outlets 36, several of which are distributed over the circumference.

Figure 4:
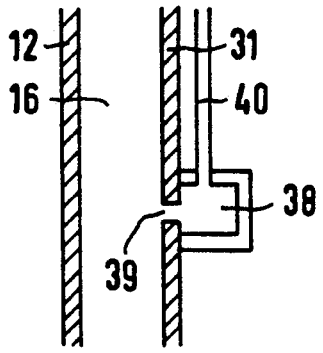
FIG. 4 is a view similar to FIG. 3, illustrating another embodiment of the gas inlets thereof.

FIG. 4 therefore diagrammatically illustrates another embodiment of the gas inlets. A ring canal 38 is disposed concentric to the second annular space 16. The ring canal 38 communicates with several holes 39 passing through the wall 31 of the second annular space 16, which are distributed over the circumference. The ring canal 38 is supplied with gas through a pipeline 40, depending on the load.

We claim:

1. In a combustion chamber having a substantially cylindrical housing and a flame tube with an end face, the flame tube being thermally movable and [centered] *disposed* in the combustion chamber and the flame tube being spaced from the cylindrical housing defining an [annular gap] *air chamber* therebetween, the improvement comprising a burner apparatus having a burner axis and including at least one pilot burner having a head and being disposed in the vicinity of the end face of the flame tube for generating a pilot flame, said pilot burner operating with at least one fuel from the group consisting of [natural] gas and heating oil, an air supply channel surrounding said head, a premixing device for [the combustion of natural gas] *mixing gas and air* in the form of a ring channel system surrounding said head, said ring channel system including flow conduction walls defining an inflow cross section at an air inflow side of said ring channel system being open toward the [annular gap] *air chamber* for conducting a majority of available combustion air in a given flow direction from the [annular gap] *air chamber* to a combustion zone developing downstream of said burner head in the flame tube, *means for producing in* the combustion air [having] flow vectors with components entering said combustion zone in directions ranging from parallel to said burner axis to an acute angle relative to said burner axis, said [combustion air] *flow vector* components having swirl components superimposed thereon [tangentially relative] *circumferentially* to said burner axis, using said burner axis as a swirl center, [a multiplicity of nozzle tubes penetrating said inflow cross section in a direction substantially transverse to said given flow direction, said nozzle tubes each having ends and having a side with] *means defining* nozzle openings [facing away from said air inflow side of] *disposed in* said ring channel system, and a [natural] gas feeding system [substantially concentrically surrounding said pilot burner and being connected to one of said ends of each of said nozzle tubes] *connected to said nozzle openings for feeding gas thereto.*

2. Burner apparatus according to claim [1] *15*, wherein said pilot burner has an axis, and said [natural] gas feeding system has an annular inlet chamber with a connecting wall for said nozzle tubes being conically bevelled relative to said axis of said pilot burner.

3. Burner apparatus according to claim [2] *16*, wherein said flow conduction walls are in the form of inner and outer walls bounding said ring channel system, each of said inner and outer walls being disposed at least approximately on a respective conical surface [having conical axes coinciding with with said axie of said pilot burner, said walls being mutually axially offset along said pilot burner axis, and said conically bevelled connecting wall of said annular inlet chamber being extended along the same direction as said inner conical wall].

4. Burner apparatus according to claim 3, *wherein said pilot burner has an axis, and said gas feeding system has an annular inlet chamber with a connecting wall for said nozzle tubes conically bevelled relative to said axis of said pilot burner, and* wherein said conically bevelled connecting wall of said annular inlet chamber at least partially coincides with said inner conical wall.

5. Burner apparatus according to claim 3, including a cylinder wall surrounding said pilot burner coaxially and defining a ring niche along with said inner flow conduction wall, said annular inlet chamber being disposed in said ring niche.

6. Burner apparatus according to claim [1] *3*, wherein said nozzle tubes have axes, and including a swirl vane system disposed downstream of said nozzle tubes having longitudinal guide vane axes extending substantially parallel to said axes of said nozzle tubes.

7. Burner apparatus according to [claims] *claim* 1, wherein said pilot burner includes a swirl star on the side of said burner head defining a flow space, a central burner tube for supplying [heating] oil, a first burner jacket surrounding said burner tube at a distance defining a first annular space for feeding [natural] gas, a nozzle wall connecting said first annular space with said flow space of said swirl star in the vicinity of said burner head, a second burner jacket in the form of an outer cylinder wall surrounding said first burner jacket at a distance defining a second annular space coaxial with said burner acting as an air supply channel of said pilot burner, said second annular space also being connected to said flow space of said swirl star[, and means for feeding an inert substance into said combustion zone].

8. Burner apparatus according to claim [2,] *17, wherein said pilot burner has an axis, and said feeding system has an annular inlet chamber with a connecting wall for said nozzle tubes conically bevelled relative to said axis of said pilot burner, and* including a [natural] gas feedline connected to said annular inlet chamber, said annular inlet chamber being steadily tapered from a larger starting cross section following said [natural] gas feedline down to a smaller end cross section, said *means defining said* nozzle [tubes] *openings* being in the form of a nozzle tube ring, a plurality of said nozzle [tubes] *openings* being connected to said end cross section of said annular inlet chamber.

9. Burner apparatus according to claim [7,] *3, wherein said pilot burner includes a swirl star on the side of said burner head defining a flow space, and* including a plurality of gas inlets distributed over the periphery of said pilot burner for supplying gas to said pilot burner, said gas inlets being fed and controlled separately and being disposed in [said] *an* air supply channel at a distance upstream from said swirl star.

10. Burner apparatus according to claim 9, *wherein said pilot burner includes a burner tube for supplying oil, and a first burner jacket surrounding said burner tube at a distance defining a first annular space for feeding gas, and* wherein said gas inlets are formed of a plurality of additional tubes passing through said first burner jacket and being distributed over the periphery of said air supply channel.

11. Burner apparatus according to claim 10, wherein said additional tubes include tube sections extending over a given distance into said air supply channel.

12. Burner apparatus according to claim 11, wherein said tube sections include a plurality of gas outlet openings within said air supply channel.

13. Burner apparatus according to claim 12, wherein said gas outlet openings are substantially perpendicular to said given flow direction.

14. Burner apparatus according to claim 9, *wherein said pilot burner includes a burner tube for supplying air, a first burner jacket surrounding said burner tube at a distance defining a first annular space for feeding gas, and a second burner jacket surrounding said first burner jacket at a distance defining a second annular space serving as an air supply channel of said pilot burner, and* including a ring canal concentric to said air supply channel and having a separate gas feedline, said gas inlets being in the form of holes formed in said [one of said] *first* burner [jackets] *jacket* communicating with said ring canal.

*15. Burner apparatus according to claim 1, including a plurality of nozzle tubes formed with said nozzle openings and penetrating said inflow cross section in a direction substantially transverse to said given flow direction.*

*16. Burner apparatus according to claim 15, wherein each of said nozzle tubes has an end, and wherein said gas feeding system surrounds said pilot burner substantially concentrically and is connected to the ends of said nozzle tubes.*

*17. Burner apparatus according to claim 1, wherein said nozzle openings face away from said air inflow side.*

*18. Burner apparatus according to claim 1, including means for feeding an inert substance, selected from the group consisting of water and steam, into said combustion zone.*

* * * * *

UNITED STATES PATENT AND TRADEMARK OFFICE

CERTIFICATE OF CORRECTION

PATENT NO. : Re. 33,896

DATED : April 21, 1992

INVENTOR(S) : Helmut Maghon and Bernard Becker

It is certified that error appears in the above-identified patent and that said Letters Patent is hereby corrected as shown below:

On the Title page, item [64], line 4, change

"Filed: Mar.4, 1988"

to

--Filed: Mar.4, 1986 --.

Signed and Sealed this

Twentieth Day of July, 1993

*Attest:*

*Attesting Officer*

Michael K. Kirk

MICHAEL K. KIRK

*Acting Commissioner of Patents and Trademarks*